(12) United States Patent
Sivakumar et al.

(10) Patent No.: US 11,263,894 B1
(45) Date of Patent: Mar. 1, 2022

(54) 5G MOBILE DEVICE BASED REGIONAL PATROLLING OVER HIGHWAYS

(71) Applicant: International Business Machines Corporation, Armonk, NY (US)

(72) Inventors: Gandhi Sivakumar, Bentleigh (AU); Lynn Kwok, Bundoora (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 17/011,031

(22) Filed: Sep. 3, 2020

(51) Int. Cl.
| | | |
|---|---|---|
| G08B 21/00 | (2006.01) | |
| G08B 25/14 | (2006.01) | |
| H04W 84/18 | (2009.01) | |
| G01S 13/50 | (2006.01) | |
| G06Q 50/26 | (2012.01) | |
| H04W 76/12 | (2018.01) | |
| H04W 4/021 | (2018.01) | |

(52) U.S. Cl.
CPC .............. *G08B 25/14* (2013.01); *G01S 13/50* (2013.01); *G06Q 50/26* (2013.01); *H04W 4/021* (2013.01); *H04W 76/12* (2018.02); *H04W 84/18* (2013.01)

(58) Field of Classification Search
CPC ........ G08B 25/14; G01S 13/50; G06Q 50/26; H04W 4/021; H04W 76/12; H04W 84/18
USPC ........................................................ 340/524
See application file for complete search history.

(56) References Cited

U.S. PATENT DOCUMENTS

| | | | |
|---|---|---|---|
| 6,737,989 B2 | 5/2004 | Flick | |
| 7,352,290 B2 | 4/2008 | Eskridge | |
| 7,382,277 B2 | 6/2008 | Ioli | |
| 9,076,331 B2 | 7/2015 | Crucs | |
| 10,440,668 B1* | 10/2019 | Wu | .................. G08G 1/22 |
| 2010/0331023 A1 | 12/2010 | Cai | |

(Continued)

FOREIGN PATENT DOCUMENTS

| | | |
|---|---|---|
| CN | 106874597 A | 6/2017 |
| JP | 2005056372 A | 3/2005 |
| WO | 2018087321 A1 | 5/2018 |

OTHER PUBLICATIONS

Anonymous et al., "5G Channel Types | 5G Logical Channels, 5G Transport Channels", RF Wireless World, India, 2012, 4 Pages.

(Continued)

*Primary Examiner* — Mark S Rushing
(74) *Attorney, Agent, or Firm* — Maeve M. Carpenter; Donald G. Weiss

(57) ABSTRACT

In an approach to 5G mobile device based regional patrolling over highways, a fifth generation (5G) mobile ad-hoc network is enabled based on data received from checkpoints. A 5G traffic channel is connected between the 5G mobile ad-hoc network and a virtual network function (VNF). Responsive to detecting that a vehicle containing a 5G UE device is in the ad-hoc network, a 5G traffic channel is connected between the UE device in the vehicle and the VNF. Responsive to receiving location information from the UE device in the vehicle, the location trajectory for the vehicle is determined. Responsive to determining that the location trajectory for the vehicle is improbable, a signal is sent to a patrol manager, where the signal includes a last received location for the vehicle.

20 Claims, 9 Drawing Sheets

(56) References Cited

U.S. PATENT DOCUMENTS

| | | | | |
|---|---|---|---|---|
| 2016/0001775 | A1* | 1/2016 | Wilhelm | B60W 40/04 |
| | | | | 701/25 |
| 2018/0054849 | A1* | 2/2018 | Hehn | H04W 4/70 |
| 2020/0064488 | A1* | 2/2020 | Shan | G01S 5/0054 |
| 2020/0090502 | A1* | 3/2020 | Yang | G06N 5/02 |

OTHER PUBLICATIONS

McLellan, Charles, "Connected cars: How 5G and IoT will affect the auto industry", Published in ZD Net, Feb. 3, 2020, 40 Pages.

Morris et al., "VECTOR: Trajectory Analysis for Advanced Highway Monitoring", Published in ITS, America's Annual Meeting 2009, Computer Vision and Robotics Research Laboratory, University of California, San Diego, Jun. 2009, 16 Pages.

Pyzyk, Katie, "Next Generation of Wireless Technology: 5G Holds Promise", Published in Transport Topics, United States, May 22, 2020, 5 Pages.

\* cited by examiner

5G MOBILE DEVICE BASED REGIONAL PATROLLING OVER HIGHWAYS

BACKGROUND

The present invention relates generally to the field of traffic control systems for road vehicles, and more particularly to fifth generation (5G) mobile device based regional patrolling over highways.

5G technology refers to the next generation of wireless technology that will replace the 4G Long Term Evolution (LTE) standard. 5G, the 5th generation of mobile networks, is a significant evolution of 4G LTE networks. 5G has been designed to meet the very large growth in data and connectivity not only of User Equipment (UE) such as smart phones, but also the internet of things (IoT) with billions of connected devices, and new technologies such as driverless cars. 5G will initially operate in conjunction with existing 4G networks before evolving to fully standalone networks in subsequent releases and coverage expansions.

SUMMARY

Embodiments of the present invention disclose a method, a computer program product, and a system for 5G mobile device based regional patrolling over highways. In one embodiment, a fifth generation (5G) mobile ad-hoc network is enabled based on data received from checkpoints. A 5G traffic channel is connected between the 5G mobile ad-hoc network and a virtual network function (VNF). Responsive to detecting that a vehicle containing a 5G UE device is in the ad-hoc network, a 5G traffic channel is connected between the UE device in the vehicle and the VNF. Responsive to receiving location information from the UE device in the vehicle, the location trajectory for the vehicle is determined. Responsive to determining that the location trajectory for the vehicle is improbable, a signal is sent to a patrol manager, where the signal includes a last received location for the vehicle.

Figure 1:
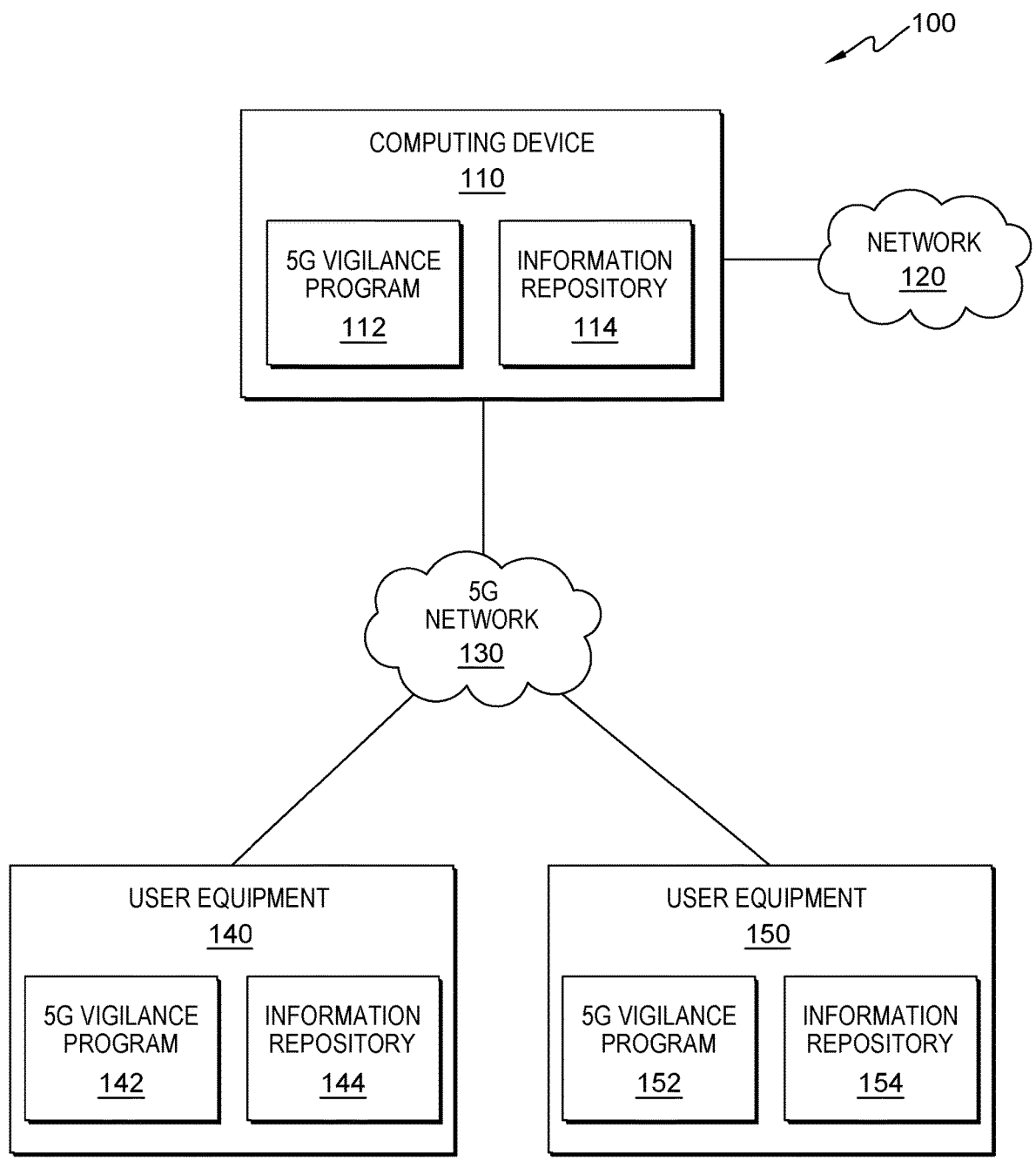
FIG. 1 is a functional block diagram illustrating a distributed data processing environment, in accordance with an embodiment of the present invention.

DETAILED DESCRIPTION 5G offers a nearly unlimited mobile broadband experience, providing massive connectivity for everything from human-held smart devices to sensors and machines, and most importantly, it has the ability to support critical machine communications with instant action and ultra-high reliability. One of the key features of 5G is that the network itself is intelligent and cognitive. Metro Ethernet technologies provide a common physical transport platform together with a Hardware Abstraction Layer (HAL) that allows support for multiple services under one physical infrastructure umbrella and allows the creation and management of multiple dedicated logical channels for specialized services.

One of the most important of these technologies is the "new radio," massive Multiple Input Multiple Output (MIMO) antennae that play an important role in achieving wireless network capabilities that far surpass 4G LTE technology.

5G architecture comprises multiple bearer channels from the RAN (Radio Access Network) between the UE device and the Evolved Node B (eNodeB, the 5G cellular base station). Both send and receive data in a bearer channel are transported by an S1 bearer between a Serving Gateway (SGW) and an eNodeB, and by a radio bearer between a UE and an eNodeB. The application traffic is transmitted and controlled using one or more logical channels that are established on top of the radio bearer and the S1 bearer.

A highway typically has staff that patrol for the safety of the people using the highway. This often includes a patrol office at a toll plaza or rest area on the highway, with a staff that monitors the vehicles on the highway and patrol vehicles to help travelers during emergencies.

Smart highways utilize closed-circuit television (CCTV) for video surveillance, with cameras placed along the highway to help identify people in need of help. Since the cameras are unable to cover the entire highway, a person in need of assistance may be out of view from these cameras, and hence may not be detected unless a patrol vehicle happens to spot them. The present invention proposes a smart approach for patrolling the highways using 5G technology and logical channeling over the 5G network to detect and locate people on the highway that are in need of help. The present invention uses smart monitoring tools placed at the service orchestration layer of the 5G network that identifies improbable patterns of vehicle movement and notifies the patrol staff of the vehicle status and geographic position to enable help to be dispatched without user intervention. This can be critical if the user is unable to summon help due to injury from, for example, a traffic accident.

The present invention is a computer-implemented method, computer program product and system that integrates a 5G Virtual Network Function and Service Orchestration Layer to monitor the vehicles on the highway between checkpoints, which are stationary structures such as a toll plaza or a rest stop, for additional patrolling. The invention includes the checkpoint that communicates with the 5G VNF via a dedicated traffic channel (DTCH). This dedicated traffic channel will be used to transfer the vehicle location data across the VFN to the signaling devices at the checkpoints. The signaling device instance contains a thin layer of software implementation that connects with other vehicle mounted IoT devices using a 5G ad-hoc network. In an embodiment, these IoT devices may include, for example, a GPS incorporated directly into the vehicle. When a device comes in the range of the intelligent patrolling checkpoints, the vehicle sends the Universally Unique Identifier (UUID) of the UE device (which could be the International Mobile Equipment Identity (IMEI) number or unique keys like the International Mobile Subscriber Identity (IMSI) or the Temporary Mobile Subscriber Identities (TMSI) number sent by the eNodeB). The information about the device UUID is received by the patrolling monitor device which sends the information to the VNF via Medium Access Control (MAC) based communication established over a dedicated traffic channel of the 5G network.

In an embodiment, the instance of the present invention running in the VNF continuously polls for the UUID of the UE device for which the detailed patrolling needs to be started or updated. In an embodiment, a map-based location tracking system is invoked when the UUID of the UE device is received by the VNF instance. The location tracking channel is active the whole time the UE device is in the patrol area, from its initial inception at the checkpoint. The VNF keeps track of each newly created DTCH created by each Physical Network Function (PNF) in the patrol region. The VNF maintains the map of all the location tracking channels that are created in the region.

In an embodiment, this service tracks the UE device movement over the highway and determines the trajectory on the road of the vehicle containing the UE device. The GPS location of this UE device is collected using another special purpose lightweight DTCH created between the UE device in the vehicle and the cell tower that continuously sends the location of the UE device to the service instance. The location trajectory is plotted from the location data and vehicle movement is tracked. This geographic coordinate information is sent to the trajectory path mapper which is part of the service orchestration layer of the 5G network.

In an embodiment, the present invention includes a service in the 5G orchestration layer instance that polls for the information supplied from the VNF and Virtualized Infrastructure Manager (VIM) functions that manage the dedicated channel monitoring across the infrastructure and the UE locations when enabled. This service in the orchestration plane collects the information from the VNF instance about the device UUID and coordinates and provides insights for the movement pattern of the vehicle. If an unusual pattern is detected by the service, then the service sends an alert message to the patrolling manager device (at the checkpoint) along with the latest coordinates of the vehicle. The unusual pattern could be, for example, the car stopped at a location with no other vehicles. The information about other active devices in the region is collected from the VNF to the service orchestration instance of the invention. For example, if a vehicle stops in between the checkpoints, then the present invention triggers the VNF to collect additional data. In response, the VNF gathers additional data like active users in the area, etc. The map-based location determination system is invoked to get the location objects for the location where the car has stopped. These collected objects are tagged and are sent to the orchestration instance and used to make the determination whether the pattern is improbable. For example, if the vehicle has stopped at a location where no other vehicles are stopped, and the location objects indicate that this is not a location where vehicles normally stop, e.g., a rest stop, then the stop is considered improbable.

In an embodiment, the instance of the present invention in the VNF translates the DTCH to UE map based on metadata mapper objects and sends the data using MAC-based data exchange to the service orchestration plane. The daemon instance of the present invention in the service plane collects the information from the VNF and inserts the location tracking for the respective UE devices and polls for the geo-locations continuously. In an embodiment, monitoring of these channels is performed based on pre-defined policies. In another embodiment, monitoring of these channels is performed based on dynamic interval policies.

For example, if a vehicle containing the UE device stops on the highway, then the service instance locates the trajectory paths of UE devices with no velocity and triggers additional data collection to the VNF for that UE device. Once the map-based tagged objects are received by the service instance, it determines the location point. If the location has, for example, a coffee shop, then the service instance predicts that the user stopped to have a cup of coffee. Other example tags could be a picnic area, a scenic photography area, etc. If none of these obvious tags are detected, and the vehicle has been stopped beyond a threshold period of time, then the stop is considered improbable and an alarm notification is sent to the patrolling staff or checkpoint location with the location of the vehicle.

In an embodiment, once the trigger is received by the patrolling staff or at the checkpoints, the checkpoint staff can respond to the location and provide assistance. In an embodiment, the dedicated logical channel between the checkpoint staff and the UUID of the UE device in the vehicle can be used to communicate directly with the user of the UE device. With this dedicated channel, the staff can inquire about the status and offer assistance to the person easily. This avoids unnecessary patrol response efforts when assistance is not necessary and improves the ability to locate the people seeking assistance on the highway.

As referred to herein, all data retrieved, collected, and used, is used in an opt in manner, i.e., the data provider has given permission for the data to be used. For example, the installation procedure for a user equipment device, such as a smart phone, that would be used to collect data could include an option that must be selected by the owner to allow use of the data. As another example, the 5G vigilance program could request approval from the owner of the device before collecting the data. Any data or information used for which the provider has not opted in is data that is publicly available.

FIG. 1 is a functional block diagram illustrating a distributed data processing environment, generally designated 100, suitable for operation of 5G vigilance program 112, 142, and 152 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, and UE 140 and 150, all connected to LTE network 130. Computing device 110 is also connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

UE 140 and 150 can each be a smart phone, standalone computing devices, a computer device incorporated into a vehicle, a management server, a web server, a mobile computing device, or any other electronic device or computing system capable of receiving, sending, and processing data. In an embodiment, UE 140 and 150 can each be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via 5G network 130. In an embodiment, UE 140 and 150 can each incorporate a location tracking device, e.g., a GPS or navigation system.

In an embodiment, computing device 110 includes instance 5G vigilance program 112 and UE 140 and 150 each includes an instance of 5G vigilance program 142 and 152, respectively. In an embodiment, 5G vigilance program 112, 142 and 152, are a program, application, or subprogram of a larger program for 5G mobile device based regional patrolling. In an alternative embodiment, 5G vigilance program 112, 142 and 152 may be located on any other device accessible by computing device 110 via network 120 or UE 140 and 150 via 5G network 130.

In an embodiment, computing device 110 and UE 140 and 150 include information repository 114, 144, and 154, respectively. In an embodiment, information repository 114, 144, and 154 may be managed by 5G vigilance program 112, 142, and 152, respectively. In an alternate embodiment, information repository 114, 144, and 154 may be managed by the operating system of computing device 110, UE 140 or UE 150 alone, or together with, 5G vigilance program 112, 142, and 152. Information repository 114, 144, and 154 each is a data repository that can store, gather, compare, and/or combine information. In some embodiments, information repository 114, 144, and 154 are located externally to computing device 110, UE 140, and UE 150, and are accessed through a communication network, such as network 120 or 5G network 130. In some embodiments, information repository 114, 144, and 154 are stored on computing device 110, UE 140, and UE 150, respectively. In some embodiments, information repository 114, 144, and 154 may reside on another computing device (not shown), provided that information repository 114, 144, and 154 are accessible by computing device 110, UE 140, and UE 150, respectively. Information repository 114, 144, and 154 may include 5G system configuration data, geographic data, highway infrastructure data, patrol area data, ad-hoc boundary network data, other data that is received by 5G vigilance program 112, 142, and 152 from one or more sources, and data that is created by 5G vigilance program 112, 142, and 152.

Information repository 114, 144, and 154 may each be implemented using any volatile or non-volatile storage media for storing information, as known in the art. For example, Information repository 114, 144, and 154 may be implemented with a tape library, optical library, one or more independent hard disk drives, multiple hard disk drives in a redundant array of independent disks (RAID), SATA drives, solid-state drives (SSD), or random-access memory (RAM). Similarly, Information repository 114, 144, and 154 may be implemented with any suitable storage architecture known in the art, such as a relational database, an object-oriented database, or one or more tables.

Figure 2:
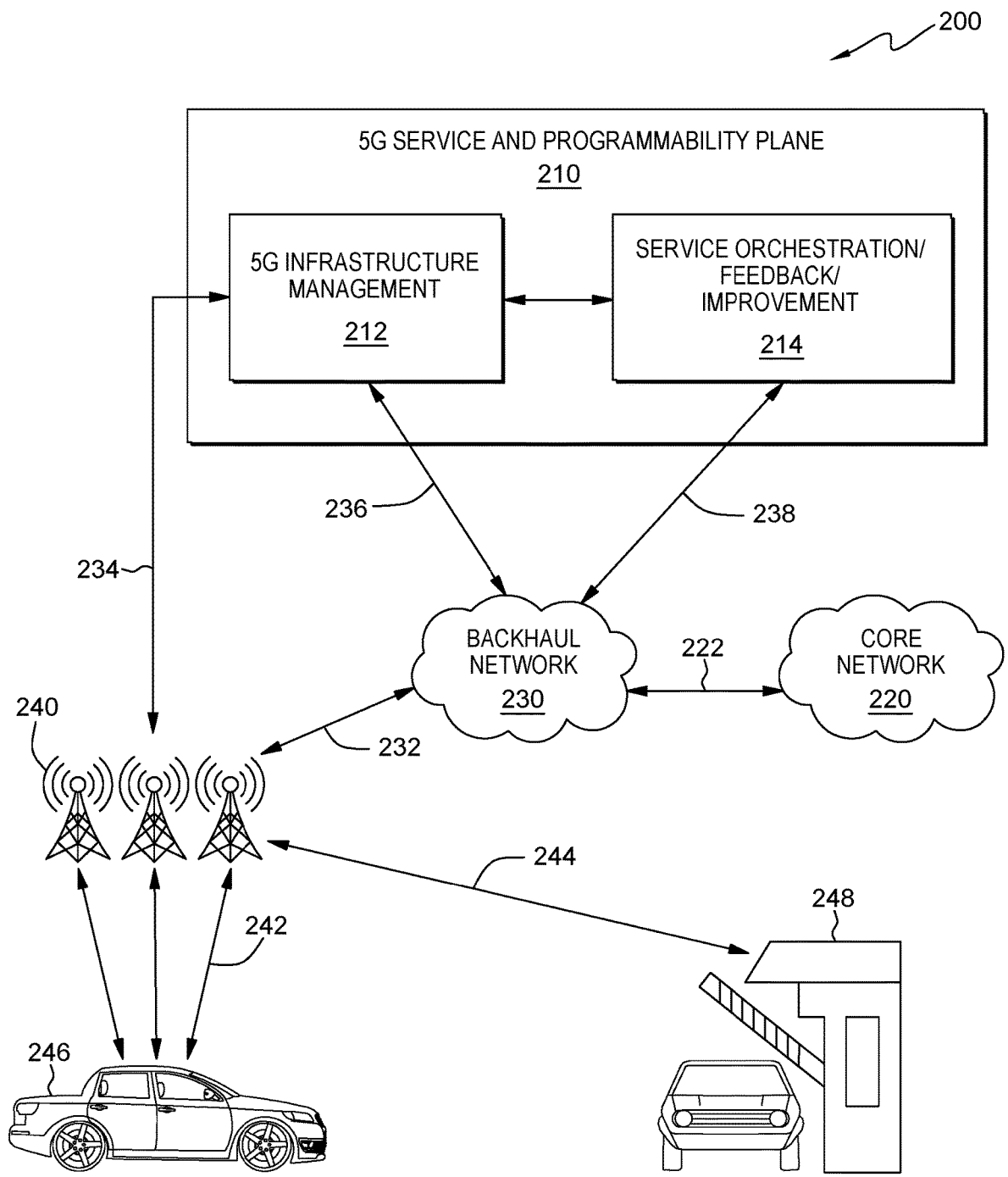
FIG. 2 is an example of a system overview of one possible embodiment of the present invention.

FIG. 2 is an example of an overview of a system, generally designated 200, of one possible embodiment of the present invention. In this example, system 200 includes 5G Service and Programmability Plane 210, which is part of computing device 110 from FIG. 1. This is the system that interfaces to the 5G mobile network and implements the invention. 5G Service and Programmability Plane 210 includes 5G Infrastructure Management 212, which is the section of computing device 110 from FIG. 1 that interfaces to the 5G mobile network infrastructure and the cellular backhaul network, and Service Orchestration/Feedback/Improvement 214, which is the section of computing device 110 from FIG. 1 that performs the control functions of the present invention.

System 200 also includes core network 220, a network that allows communication between any number of computing devices, and will allow access to the internet or any other network access required by any of the devices or programs running on the devices. In an embodiment, core network 220 is network 120 from FIG. 1. Backhaul network 230 is the network connection between the cell sites and core network 220, which ensures the network connectivity of the end user. Network connection 222 is a connection between backhaul network 230 and core network 220.

System 200 also includes cell towers 240, which include all base station components, such as the eNodeBs, that make up the 5G mobile network. Cell towers 240 connect to UE 246 via DTCH connections 242. In the example illustrated in FIG. 2, UE 246 represents one UE device that is connected to the 5G mobile network. In an embodiment, system 200 may include any number of UE devices connected to the 5G network, for example, UE 140 and 150 of FIG. 1. Network connection 234 is a connection between the cell towers 240 and 5G infrastructure management 212.

Backhaul network 230 also includes network connections 236 and 238, which are alternate connections between the cell towers 240, 5G Infrastructure Management 212, and Service Orchestration/Feedback/Improvement 214. Backhaul network 230 also includes network connection 232 between backhaul network 230 and the cell towers 240.

System 200 also includes checkpoint 248, which represents a checkpoint that is connected to the 5G mobile network. In the example illustrated in FIG. 2, the checkpoint is a toll booth. In another example, the checkpoint may be a rest stop. DTCH 244 is a connection between checkpoint 248 and cell towers 240.

Figure 3:
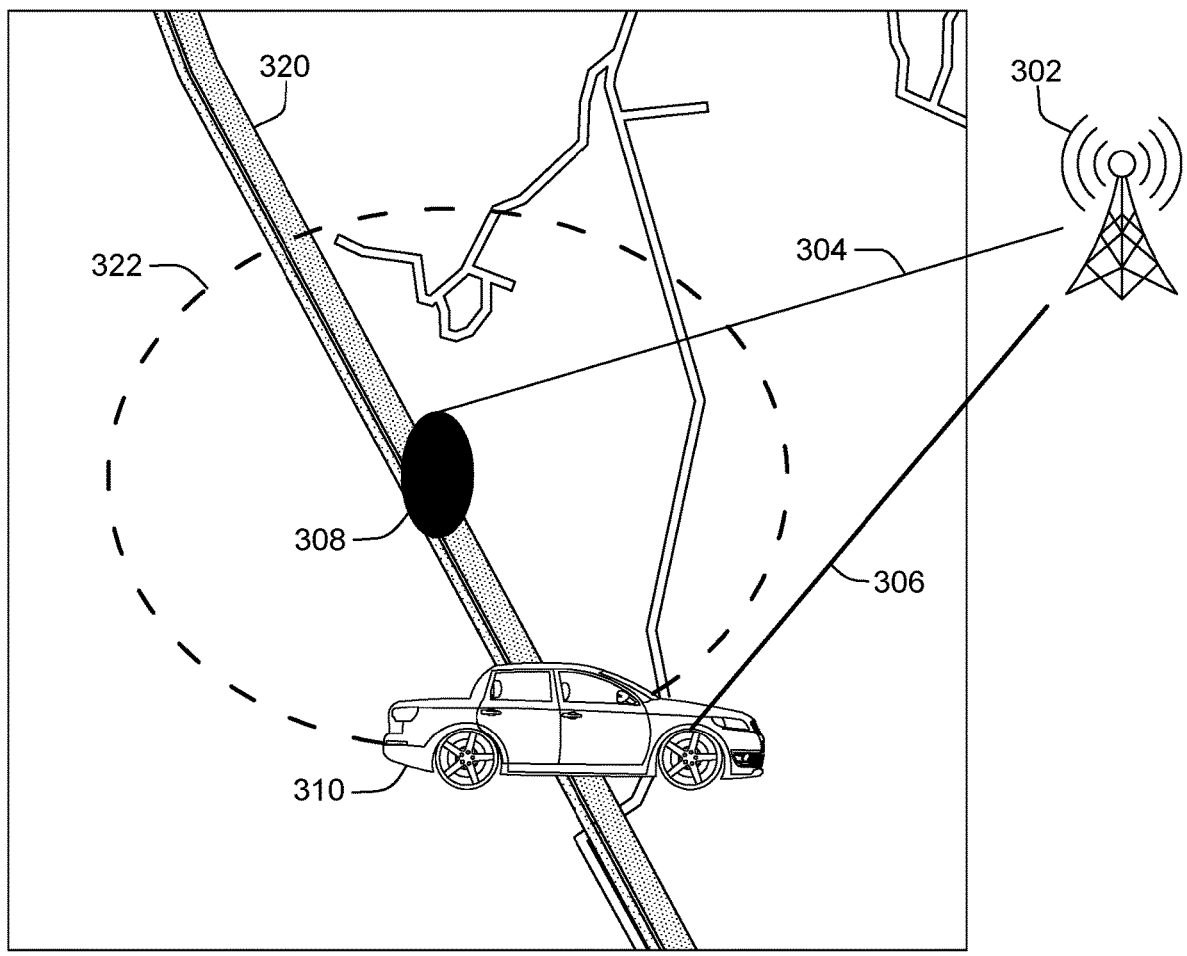
FIG. 3 is an example of initiating geographic status information in one possible embodiment of the present invention.

FIG. 3 is an example of initiating geographic status information in one possible embodiment of the present invention. In this example, UE device 310 is user equipment, for example, UE 140 and 150 of FIG. 1, or UE 246 of FIG. 2. UE device 310 is travelling on highway 320, which represents the road that is patrolled by security staff. The security staff could be police, the highway department, a service responsible for assisting travelers, or any other service that can provide assistance to travelers along the road. UE device 310 is connected via DTCH 306 to cell tower 302. DTCH 306 is, for example, DTCH connection 242 from FIG. 2. Cell tower 302 is, for example, cell tower 240 from FIG. 2. Patrol start location 308 is a checkpoint for the patrol area, such as checkpoint 248 from FIG. 2. As described above for FIG. 2, this checkpoint can be a toll plaza, rest stop, police station, etc. Patrol start location 308 is connected via DTCH 304 to cell tower 302. DTCH 304 is, for example, DTCH connection 242 from FIG. 2. Ad-hoc network boundary 322 is the network boundary area covered by cell tower 302. This represents the section of highway 320 that is within the range of the radio in cell tower 302.

In an embodiment illustrated in FIG. 3, UE 310 is travelling on highway 320 and passes through patrol start location 308, for example, a toll plaza. Patrol start location 308 sends a notification to cell tower 302 via DTCH 304 to start tracking UE 310 as it continues along highway 320. As UE 310 travels along highway 320, cell tower 302 will monitor position information from UE 310 via DTCH 306. Cell tower 302 will continue to monitor the status of UE 310 as long as UE 310 remains within ad-hoc network boundary 322.

Figure 4:
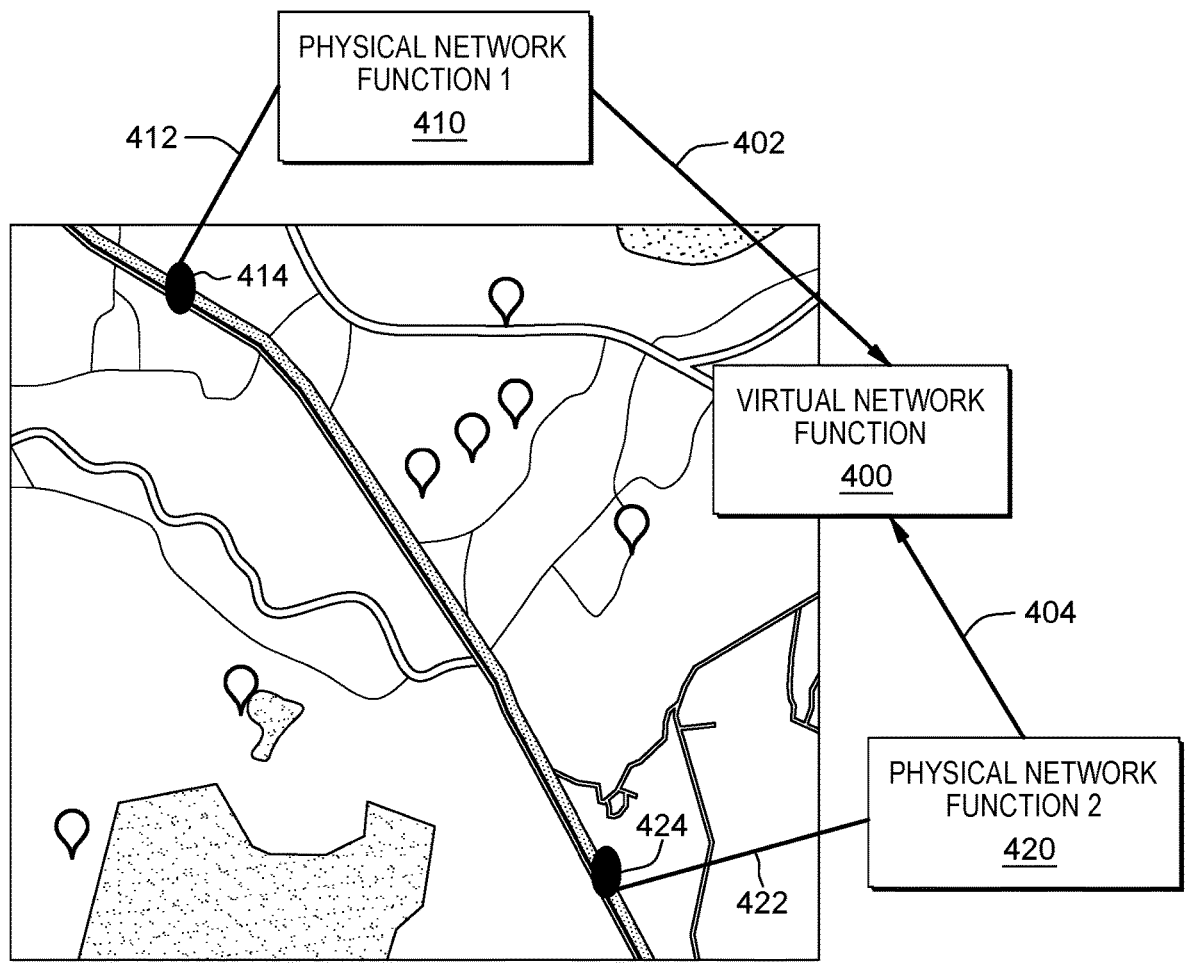
FIG. 4 is an example of the Virtual Network Function (VNF) data collection and locator function in one possible embodiment of the present invention.

FIG. 4 is an example of VNF data collection and location tracking in one possible embodiment of the present invention. VNF 400 is the virtual network orchestration layer that monitors the geographic patrol area using a shared physical infrastructure. In an embodiment, VNF 400 is 5G Service and Programmability Plane 210 from FIG. 2. In this example, VNF 400 contains PNF_1 410 and PNF_2 420. In an embodiment, PNF_1 410 and PNF_2 420 are cell towers 240 from FIG. 2 or cell tower 302 from FIG. 3. Network connection 402 is the dedicated connection between PNF_1 410 and VNF 400. Network connection 404 is the dedicated connection between PNF_2 420 and VNF 400. Network connection 402 and network connection 404 may be, for example, network connection 234 from FIG. 2.

The patrol area of the example illustrated in FIG. 4 extends from patrol start location 414 to patrol start location 424. In other examples of other embodiments, the patrol area may extend beyond patrol start location 414 and patrol start location 424, including as many different patrol segments as are connected to VNF 400. Patrol start location 414 and patrol start location 424 may each be, for example, a toll plaza such as checkpoint 248 from FIG. 2 or patrol start location 308 from FIG. 3. Patrol start location 414 connects to PNF_1 410 and patrol start location 424 connects to PNF_2 420 via DTCH 412 and DTCH 422, respectively. In an embodiment, DTCH 412 and DTCH 422 may be DTCH 244 from FIG. 1 or DTCH 304 from FIG. 3.

Figure 5:
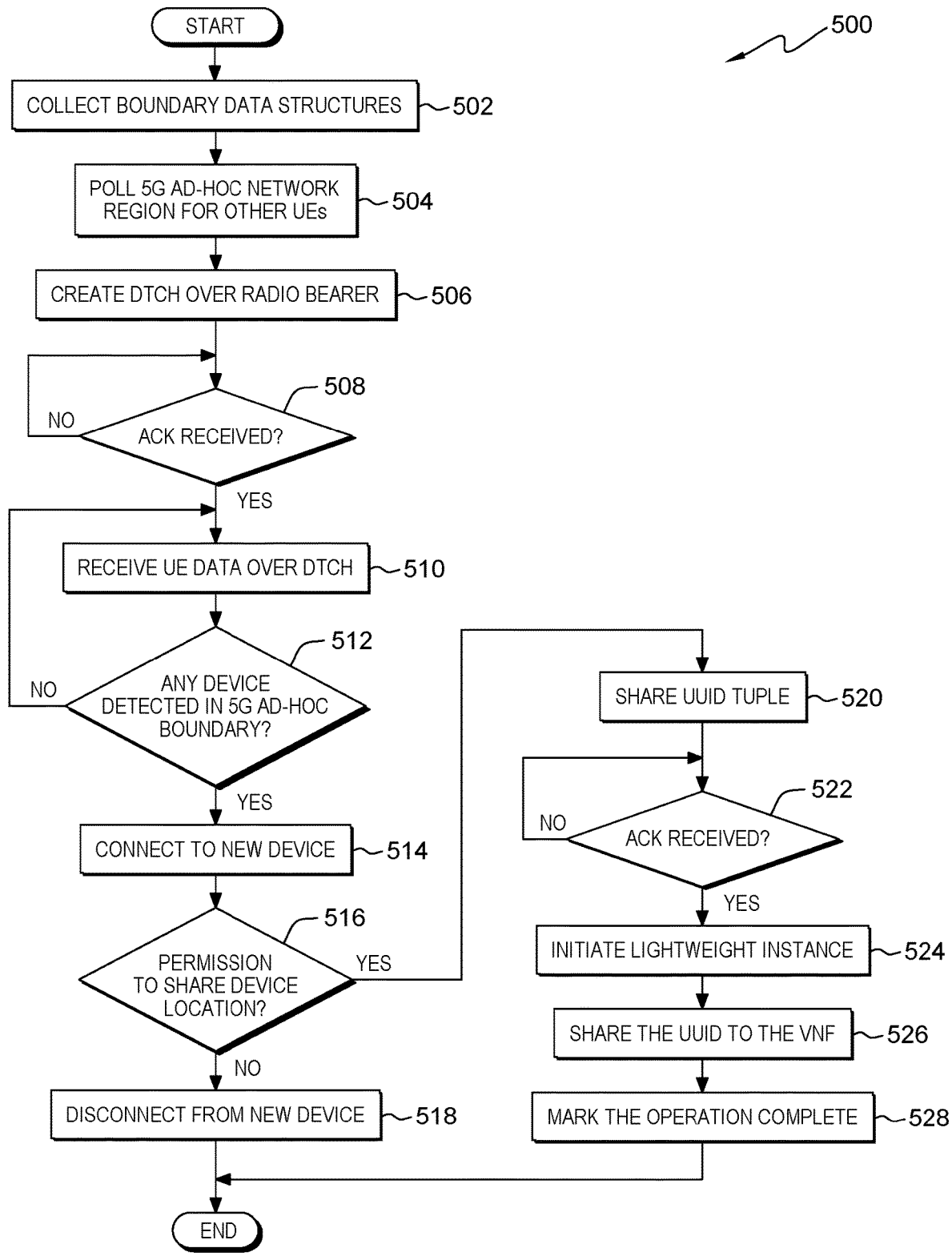
FIG. 5 is a flowchart depicting operational steps of the section of code performed by the instance of the 5G vigilance program running at the checkpoints, within the distributed data processing environment of FIG. 1, in accordance with an embodiment of the present invention.

FIG. 5 is a flowchart depicting operational steps of the section of code performed by the instance of 5G vigilance program 112 running at the checkpoints, for 5G mobile device based regional patrolling over highways. In an embodiment, 5G vigilance program 112 collects the boundary definition from static configuration parsing. In an embodiment, 5G vigilance program 112 begins polling in the 5G ad-hoc network boundary definition region for other UE devices. In an embodiment, 5G vigilance program 112 creates a 5G dedicated traffic channel between the checkpoint, e.g., patrol start location 308 from FIG. 3 or checkpoints 414 and 424 from FIG. 4. In an embodiment, if 5G vigilance program 112 determines that an ACK was not received from the eNodeB, then 5G vigilance program 112 remains in this step until the ACK is received. In an embodiment, if 5G vigilance program 112 determines that an ACK was received from the eNodeB, then 5G vigilance program 112 sends patrolling UE data over this traffic channel to track UE devices in the patrol area. In an embodiment, 5G vigilance program 112 determines if any UE device is detected in the 5G ad-hoc network boundary, such as ad-hoc network boundary 322 from FIG. 3. In an embodiment, if 5G vigilance program 112 determines that any device was detected in 5G ad-hoc boundary area, then 5G vigilance program 112 establishes a connection to the new UE device. In an embodiment, 5G vigilance program 112 determines if it has received permission to share the location information from the UE device, as explained above. In an embodiment, if 5G vigilance program 112 determines that it does not have permission to share device location, then 5G vigilance program 112 disconnects from the new device and ends for this cycle. In an embodiment, 5G vigilance program 112 shares the UUID tuple received from the UE device with the VNF. In an embodiment, 5G vigilance program 112 determines if the tuple reception ACK was received from the VNF. In an embodiment, if 5G vigilance program 112 determines that an ack was not received, then 5G vigilance program 112 remains in this step until an ACK is received. In an embodiment, if 5G vigilance program 112 determines that an ack was received, then 5G vigilance program 112 initiates a client lightweight instance of the 5G vigilance program on the new UE device, for example, 5G vigilance program 142 on UE 140 of FIG. 1. In an embodiment, 5G vigilance program 112 shares the UUIDs for each UE device in the 5G ad-hoc boundary area with the VNF. In an embodiment, since 5G vigilance program 112 has established a tracking connection between 5G Service and Programmability Plane and the UE device, 5G vigilance program 112 marks the operation complete. 5G vigilance program 112 then ends for this cycle.

In an alternative embodiment, the steps of workflow 500 may be performed by any other program while working with 5G vigilance program 112. It should be appreciated that embodiments of the present invention provide at least for 5G mobile device based regional patrolling over highways. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

5G vigilance program 112 collects boundary data structures (step 502). In an embodiment, 5G vigilance program 112 5G vigilance program 112 collects the boundary definition from static configuration parsing. In another embodiment, 5G vigilance program 112 receives the boundary definition dynamically by requesting data directly from the UE devices. In an embodiment, 5G vigilance program 112 receives data structures required for enablement of the mobile ad-hoc network from the checkpoints. In another embodiment, 5G vigilance program 112 sets a default mode of operation for the 5G ad-hoc network.

5G vigilance program 112 polls a 5G ad-hoc network region for other UEs (step 504). In an embodiment, 5G vigilance program 112 begins polling in the 5G ad-hoc network boundary definition region for other UE devices. In an embodiment, 5G vigilance program 112 receives a response from the checkpoints within the ad-hoc 5G network and then continues to step 506.

5G vigilance program 112 creates a DTCH using a radio bearer (step 506). In an embodiment, 5G vigilance program 112 creates a 5G DTCH between the checkpoint, e.g., patrol start location 308 from FIG. 3 or checkpoints 414 and 424 from FIG. 4, and the eNodeB. 5G vigilance program 112 creates the DTCH using a channel create instruction over a radio bearer, and then creates an S1 bearer between the eNodeB and the SGW for signaling. The channel create instruction is received by the eNodeB, and a DTCH_ID is assigned for the channel by the eNodeB. In an embodiment, the eNodeB sends the DTCH_ID to the SGW over the S1 interface. In addition, the ACK is sent to the checkpoint over the Common Control Channel (CCCH—the channel for transmitting control information between UEs and network).

5G vigilance program 112 determines if an ACK was received (decision block 508). In an embodiment, if 5G vigilance program 112 determines that an ACK was not received from the eNodeB ("no" branch, decision block 508), then 5G vigilance program 112 remains in decision block 508 until the ACK is received. In an embodiment, if the time waiting for the reception of the ACK exceeds a threshold, then 5G vigilance program 112 resends the channel create instruction. In another embodiment, if the time waiting for the reception of the ACK exceeds a threshold, then 5G vigilance program 112 signals an error and proceeds to step 518 to disconnect from the UE device.

5G vigilance program 112 receives UE data over the DTCH (step 510). In an embodiment, if 5G vigilance program 112 determines that ACK was received from the eNodeB ("yes" branch, decision block 508), then 5G vigilance program 112 sends patrolling UE data over this traffic channel to track UE devices in the patrol area.

5G vigilance program 112 determines if any device was detected in the 5G ad-hoc boundary (decision block 512). In an embodiment, 5G vigilance program 112 determines if any UE device was detected in the 5G ad-hoc network boundary, such as ad-hoc network boundary 322 from FIG. 3. In an embodiment, the ad-hoc network boundary is the area covered by a single cell tower. In an embodiment, if 5G vigilance program 112 determines that no new device was detected in 5G ad-hoc boundary area ("no" branch, decision block 512), then 5G vigilance program 112 returns to step 510 to continue to send location data on existing UE devices in the 5G ad-hoc boundary area and continues to check for new UE devices entering the 5G ad-hoc boundary area.

5G vigilance program 112 connects to the new UE device (step 514). In an embodiment, if 5G vigilance program 112 determines that a new UE device was detected in the 5G ad-hoc boundary area ("yes" branch, decision block 512), then 5G vigilance program 112 establishes a DTCH to the new UE device. 5G vigilance program 112 then authenticates the new UE device using normal 5G authentication protocols and parses the permission settings for the device.

5G vigilance program 112 determines if it has permission to share the UE device location (decision block 516). In an embodiment, 5G vigilance program 112 determines if it has received permission to share the location information from the UE device, as explained above. In an embodiment, if 5G vigilance program 112 determines that it has permission to share device location ("yes" branch, decision block 516), then 5G vigilance program 112 proceeds to step 520 to share the information with the tracking system.

5G vigilance program 112 disconnects from new device (I/O) request (step 518). In an embodiment, if 5G vigilance program 112 determines that it does not have permission to share device location ("no" branch, decision block 516), then 5G vigilance program 112 returns to step 510 to continue to send location data on existing UE devices in the 5G ad-hoc boundary area and continues to check for new UE devices entering the 5G ad-hoc boundary area.

5G vigilance program 112 shares the UUID tuple (step 520). In an embodiment, 5G vigilance program 112 shares the UUID tuple received from the UE device with the VNF. In an embodiment, the UUID tuple includes standard 5G parameters such as the IMSI, the TIMSI, the IMEI, etc.

5G vigilance program 112 determines if an ACK was received (decision block 522). In an embodiment, 5G vigilance program 112 determines if the tuple reception ACK was received from the VNF. In an embodiment, if 5G vigilance program 112 determines that an ACK was not received ("no" branch, decision block 522), then 5G vigilance program 112 remains in decision block 522 until an ACK is received. In an embodiment, if the time waiting for the reception of the ACK exceeds a threshold, then 5G vigilance program 112 resends the UUID tuple. In another embodiment, if the time waiting for the reception of the ACK exceeds a threshold, then 5G vigilance program 112 signals an error and proceeds to step 518 to disconnect from the UE device.

5G vigilance program 112 initiate a lightweight instance (step 524). In an embodiment, if 5G vigilance program 112 determines that an ack was received ("yes" branch, decision block 522), then 5G vigilance program 112 initiates a client lightweight instance of the 5G vigilance program on the new UE device, for example, 5G vigilance program 142 on UE 140 of FIG. 1.

5G vigilance program 112 shares the UUID with the VNF (step 526). In an embodiment, 5G vigilance program 112 shares the UUIDs for each UE device in the 5G ad-hoc boundary area with the VNF. This allows the VNF to track each UE device in the patrol area.

5G vigilance program 112 marks the operation complete (step 528). In an embodiment, since 5G vigilance program 112 has established a tracking connection between 5G Service and Programmability Plane and the UE device, 5G vigilance program 112 marks the operation complete. 5G vigilance program 112 then ends for this cycle.

Figure 6:
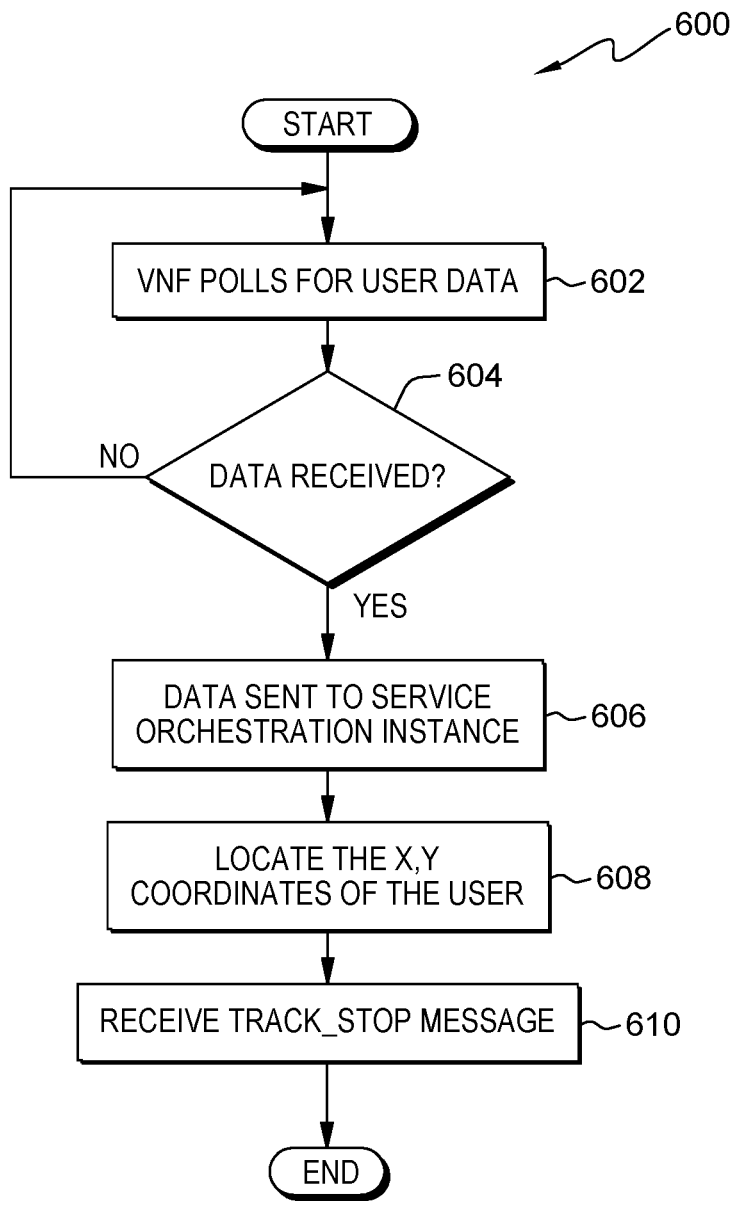
FIG. 6 is a flowchart depicting operational steps of the section of code performed by the instance of the 5G vigilance program running at the VNF systems, within the distributed data processing environment of FIG. 1, in accordance with an embodiment of the present invention.

FIG. 6 is a flowchart depicting operational steps of the section of code performed by the instance of 5G vigilance program 112 running at the VNF systems, for 5G mobile device based regional patrolling over highways. In an embodiment, 5G vigilance program 112 polls from the static checkpoints, for example, patrol start location 308 from FIG. 3 or checkpoints 414 and 424 from FIG. 4. In an embodiment, 5G vigilance program 112 determines if any UE device data was received from the checkpoint. In an embodiment, if 5G vigilance program 112 determines if data was received, then 5G vigilance program 112 streams the location data to the service orchestration instance, e.g., Service Orchestration/Feedback/Improvement 214 from FIG. 2. In an embodiment, 5G vigilance program 112 receives the location data and uses a map-based identifier to locate the X-Y coordinates of the UE device. In an embodiment, when the checkpoint sends a TRACK_STOP message, indicating that the UE device is no longer in the monitored area, 5G vigilance program 112 unloads the respective DTCH from the monitoring table; unmaps the UUID from the mapping database; and unloads the location sharing network slicing channel from eNodeB by instructing the respective PNF in the virtual infrastructure management.

In an alternative embodiment, the steps of workflow 600 may be performed by any other program while working with 5G vigilance program 112. It should be appreciated that embodiments of the present invention provide at least for 5G mobile device based regional patrolling over highways. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

5G vigilance program 112 polls for user data (step 602). In an embodiment, 5G vigilance program 112 polls from the static checkpoints, for example, patrol start location 308 from FIG. 3 or checkpoints 414 and 424 from FIG. 4. In an embodiment, 5G vigilance program 112 polls for any new geographic data from any UE device within the 5G ad-hoc boundary area of the checkpoint.

5G vigilance program 112 determines if data was received (decision block 604). In an embodiment, 5G vigilance program 112 determines if any UE device data was received from the checkpoint. In an embodiment, if 5G vigilance program 112 determines that data was not received ("no" branch, decision block 604), then 5G vigilance program 112 returns to step 602 to continue polling for user data.

In an embodiment, if 5G vigilance program 112 determines that data was received ("yes" branch, decision block 604), then: 5G vigilance program 112 parses the message to extract field information; 5G vigilance program 112 extracts the mobility UUID; 5G vigilance program 112 requests the information for required device UUID from the respective PNF, e.g., PNF_1 410 or PNF_2 420 from FIG. 4; and 5G vigilance program 112 invokes the PNF collection protocols to retrieve the UUID information and other interrelated 5G information, local active time, and location maps for this UUID.

Once 5G vigilance program 112 receives the UUID information, 5G vigilance program 112 updates the metadata monitoring mapper tables with the new UUID. 5G vigilance program 112 requests creation of a special communication channel (step 506 in FIG. 5), receives the DTCH_ID, and updates the monitoring table. This indicates that the new DTCH is active and 5G vigilance program 112 is receiving data from the new UE device. The information received on this location finder DTCH is of the form <UUID, LOCATION>.

5G vigilance program 112 sends data to the service orchestration instance (step 606). In an embodiment, 5G vigilance program 112 streams the location data to the service orchestration instance, e.g., Service Orchestration/Feedback/Improvement 214 from FIG. 2. In an embodiment, 5G vigilance program 112 uses an internal 5G in-band protocol to stream the location data to the service orchestration instance. In another embodiment, 5G vigilance program 112 uses a 5G out-of-band protocol to stream the location data to the service orchestration instance.

5G vigilance program 112 locates the X,Y coordinates of the user (step 608). In an embodiment, 5G vigilance program 112 receives the location data and uses a map-based identifier to locate the X-Y coordinates of the UE device. In an embodiment, 5G vigilance program 112 then performs a lookup of objects in the neighboring region of the UE device location in an objects database, and creates an OBJECT_LIST containing the structures found in the database. This object structure is sent for further determination to service orchestration instance.

5G vigilance program 112 receives a TRACK_STOP message (step 610). In an embodiment, when the checkpoint sends a TRACK_STOP message, indicating that the UE device is no longer in the monitored area, 5G vigilance program 112 unloads the respective DTCH from the monitoring table; unmaps the UUID from the mapping database; and unloads the location sharing network slicing channel from eNodeB by instructing the respective PNF in the virtual infrastructure management. In an embodiment, 5G vigilance program 112 then stops tracking that particular UE device.

Figure 7:
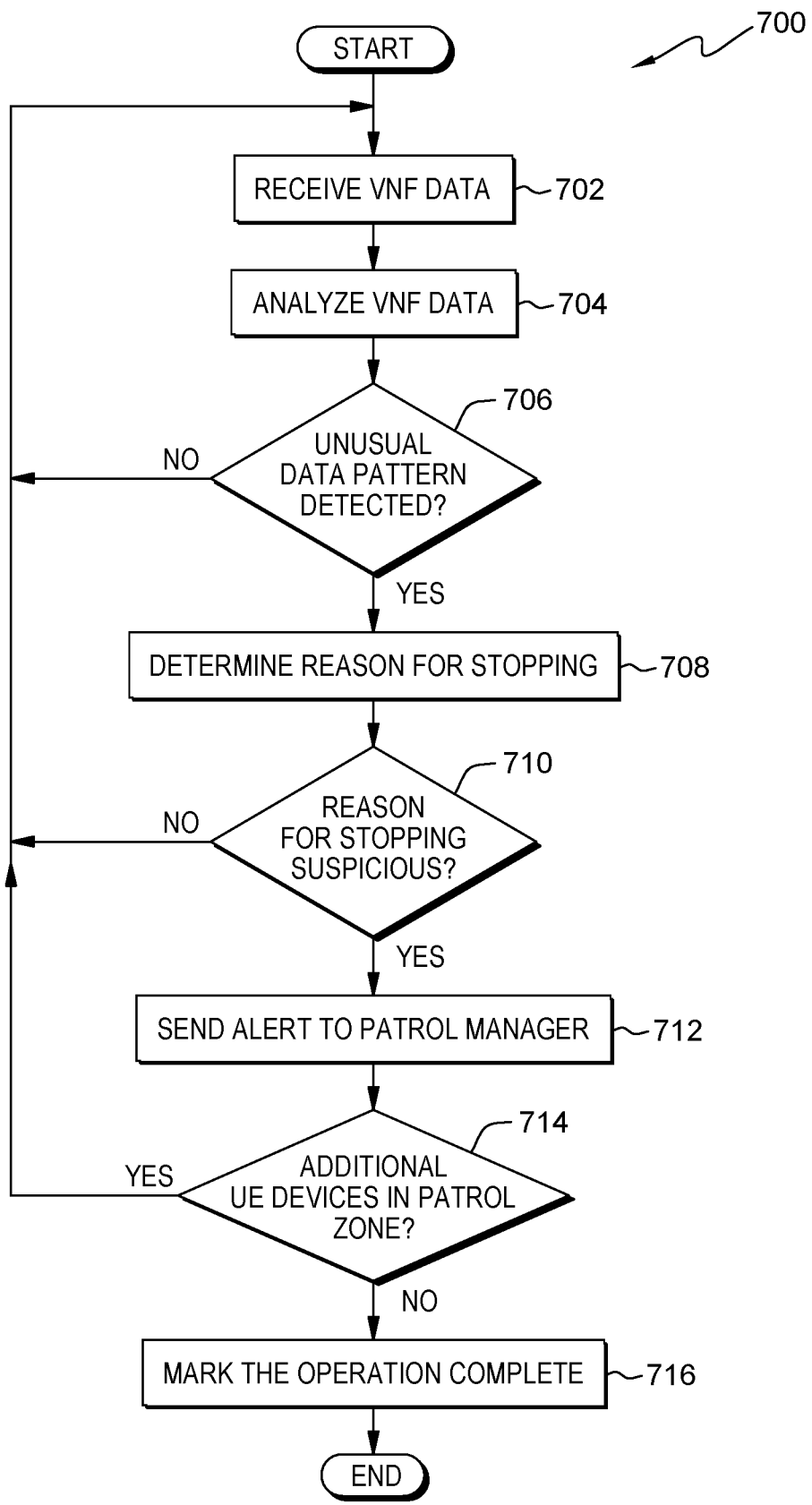
FIG. 7 is a flowchart depicting operational steps of the section of code performed by the instance of the 5G vigilance program running at the orchestration service, within the distributed data processing environment of FIG. 1, in accordance with an embodiment of the present invention.

FIG. 7 is a flowchart depicting operational steps of the section of code performed by the instance of 5G vigilance program 112 running at the orchestration service, for 5G mobile device based regional patrolling over highways. In an embodiment, 5G vigilance program 112 polls the VNF and VIM for data. In an embodiment, 5G vigilance program 112 analyzes the VNF data to determine the trajectory of the UE device movement by collecting time-based location information of the UE device. In an embodiment, 5G vigilance program 112 determines if an unusual data pattern was detected in the VNF data analyzed in the previous step. In an embodiment, if 5G vigilance program 112 determines that an unusual data pattern was detected, then 5G vigilance program 112 determines if the reason for stopping is improbable. In an embodiment, if 5G vigilance program 112 determines that the reason for stopping is improbable, then 5G vigilance program 112 sends an alert message to the patrolling manager device to notify the patrol manager that a vehicle has made an improbable stop. In an embodiment, 5G vigilance program 112 determines if there are additional UE devices in the patrol zone. In an embodiment, if 5G vigilance program 112 determines that there are no additional UE devices in the patrol zone ("no" branch, decision block 714), then 5G vigilance program 112 marks the operation complete. 5G vigilance program 112 then ends for this cycle.

In an alternative embodiment, the steps of workflow 700 may be performed by any other program while working with 5G vigilance program 112. It should be appreciated that embodiments of the present invention provide at least for 5G mobile device based regional patrolling over highways. However, FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

5G vigilance program 112 receives the VNF data (step 702). In an embodiment, 5G vigilance program 112 polls the VNF and VIM for data. In a network, the VIM manages the hardware and software resources that the service provider uses to create service chains and deliver network services to customers. Once 5G vigilance program 112 has received the data from the VNF, 5G vigilance program 112 collects the UUID information and ordinate places structure.

5G vigilance program 112 analyzes the VNF data (step 704). In an embodiment, 5G vigilance program 112 analyzes the VNF data to determine the trajectory of the UE device movement by collecting time-based location information of the UE device. In an embodiment, 5G vigilance program 112 determines the trajectory of the UE device movement based on velocity, acceleration, and device movement along the highway from the ordinate places structure. In an embodiment, 5G vigilance program 112 utilizes a service daemon running in the VNF to determine the trajectory of the UE device movement.

5G vigilance program 112 determines if an unusual data pattern was detected (decision block 706). In an embodiment, 5G vigilance program 112 determines if an unusual data pattern was detected in the VNF data analyzed in step 704. In an embodiment, if 5G vigilance program 112 determines that an unusual data pattern was not detected ("no" branch, decision block 706), then 5G vigilance program 112 returns to step 702 to continue to receive and analyze VNF data. In an embodiment, if 5G vigilance program 112 cannot determine whether a data pattern was unusual, then 5G vigilance program 112 treats the data pattern as unusual. In another embodiment, if 5G vigilance program 112 cannot determine whether a data pattern was unusual, then 5G vigilance program 112 treats the data pattern as not unusual.

In an embodiment, 5G vigilance program 112 determines if an unusual data pattern was detected by gathering tracked and managed boundary definitions for the respective location oriented tags for the specific expectations of the locations. For example, if the location is tagged as a "coffee shop", then the expectation here is that the duration of the "stop" will be 10 to 15 minutes. Therefore, if the location of the stop has a tag of "coffee shop" and the vehicle has stopped for longer than 15 minutes, then 5G vigilance program 112 determines that the data pattern is unusual. In an embodiment, the length of time over the expected length of time for the stop that is considered unusual is a default. In another embodiment, the length of time over the expected length of time for the stop that is considered unusual is set by the user. Other example tags could be, for example, "picnic spot", "photography area", etc. If there are no tagged objects associated with the location where the car is stopped and remained for a time above a threshold, then the this can be detected as "unusual". For example, if the vehicle stops at a place where normally no vehicles stop, and the nearest house or other facility is one mile away, this could be an improbable data pattern.

5G vigilance program 112 determines the reason for stopping (step 708). In an embodiment, if 5G vigilance program 112 determines that an unusual data pattern was detected ("yes" branch, decision block 706), then 5G vigilance program 112 sends the <X,Y> pair to the VNF and requests the map tags from the ordinate places structure. In an embodiment, 5G vigilance program 112 receives the map tags from the VNF and extracts the tagging objects to determine the reason for the improbable behavior.

5G vigilance program 112 determines if the reason for stopping is improbable (decision block 710). In an embodiment, if 5G vigilance program 112 determines that the reason for stopping is not improbable ("no" branch, decision block 710), then 5G vigilance program 112 returns to step 702 to continue to receive and analyze VNF data.

In an embodiment, 5G vigilance program 112 determines that the reason for stopping is improbable if the UE device stopped at a location that is not expected, i.e., the location is not a rest stop, service area, restaurant, or other place along the patrol area that a vehicle would be expected to stop. In another embodiment, 5G vigilance program 112 determines that the reason for stopping is improbable if the UE device stopped at a location for a time that is longer than expected. In an embodiment, 5G vigilance program 112 determines a time that is longer than expected bases on a predetermined threshold. In another embodiment, 5G vigilance program 112 determines a time that is longer than expected based on a user default set by the user of the UE device during the opt-in process discussed earlier. In yet another embodiment, 5G vigilance program 112 determines a time that is longer than expected based on an average time that the aggregate users spend at that particular location. In other embodiments, 5G vigilance program 112 determines a time that is longer than expected using any other method as would be known to a person in the art.

5G vigilance program 112 send alert to patrol manager (step 712). In an embodiment, if 5G vigilance program 112 determines that the reason for stopping is improbable ("yes" branch, decision block 710), then 5G vigilance program 112 sends an alert message to the patrolling manager device to notify the patrol manager that a vehicle has made an improbable stop. In an embodiment, 5G vigilance program 112 then sends the latest coordinates and UUID tuple of the UE device to the checkpoint UE. In an embodiment, 5G vigilance program 112 uses the DTCH between static checkpoint UE and the VNF to send the device information with the message structure. In another embodiment, 5G vigilance program 112 uses CCCH radio frames to transmit the SIGNAL to checkpoint.

5G vigilance program 112 determines if there are additional UE devices in the patrol zone (decision block 714). In an embodiment, if 5G vigilance program 112 determines that there are additional UE devices in the patrol zone ("yes" branch, decision block 714), then 5G vigilance program 112 returns to step 702 to continue to receive and analyze VNF data.

5G vigilance program 112 marks the operation complete (step 716). In an embodiment, if 5G vigilance program 112 determines that there are no additional UE devices in the patrol zone ("no" branch, decision block 714), then 5G vigilance program 112 marks the operation complete. 5G vigilance program 112 then ends for this cycle.

Figure 8:
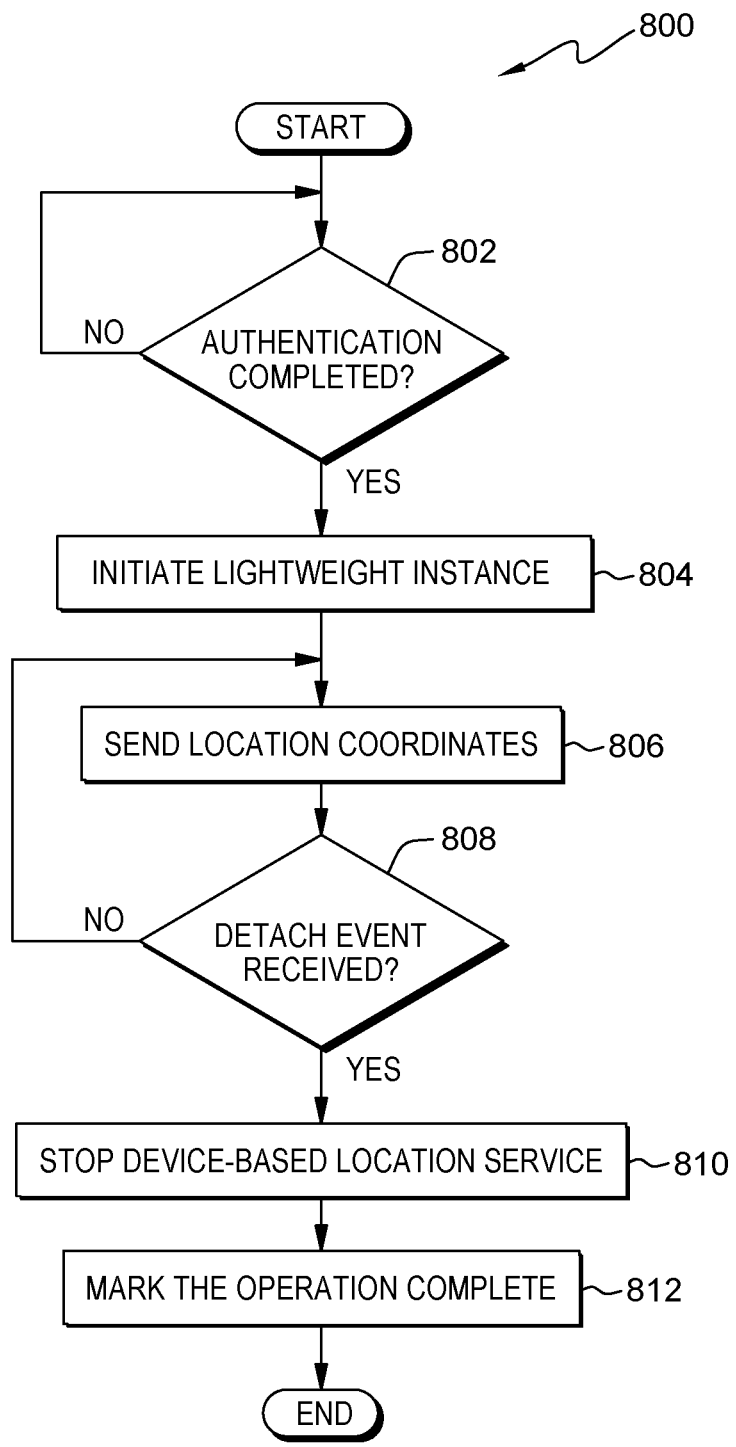
FIG. 8 is a flowchart depicting operational steps of the section of code performed by the instance of the 5G vigilance program running on the UE device, within the distributed data processing environment of FIG. 1, in accordance with an embodiment of the present invention.

FIG. 8 is a flowchart depicting operational steps of the section of code performed by the instance of the 5G vigilance program running on the UE devices, 5G vigilance program 142 and 152, for 5G mobile device based regional patrolling over highways. In an embodiment, if 5G vigilance program 142 and 152 determines that the UE has not been authenticated by the 5G network, then 5G vigilance program 142 and 152 remains in this step until the authentication has completed. In an embodiment, if 5G vigilance program 142 and 152 determines that the authentication has completed, then 5G vigilance program 142 and 152 initiates a lightweight DTCH between the UE device and the cell tower. In an embodiment, the instance of 5G vigilance program 142 and 152 running on the UE device invokes the device-based location service and transfers the location coordinates to the lightweight DTCH. In an embodiment, if 5G vigilance program 142 and 152 determines that a DETACH event was not received, then 5G vigilance program 142 and 152 returns to the previous step to update the location coordinates of the UE device. In an embodiment, if 5G vigilance program 142 and 152 determines that a DETACH event was received, then 5G vigilance program 142 and 152 stops the device-based location service on this UE device; releases the resources of this logical slice of 5G vigilance program 142 and 152; and unmaps the local channel database for the lightweight DTCH. In an embodiment, 5G vigilance program 142 and 152 marks the operation complete. 5G vigilance program 142 and 152 then ends for this cycle.

In an alternative embodiment, the steps of workflow 800 may be performed by any other program while working with 5G vigilance program 142 and 152. It should be appreciated that embodiments of the present invention provide at least for 5G mobile device based regional patrolling over highways. However, FIG. 8 provides only an illustration of one implementation and does not imply any limitations with regard to the environments in which different embodiments may be implemented. Many modifications to the depicted environment may be made by those skilled in the art without departing from the scope of the invention as recited by the claims.

5G vigilance program 142 and 152 determine if the authentication completed (decision block 802). In an embodiment, if 5G vigilance program 142 and 152 determine that the UE has not been authenticated by the 5G network ("no" branch, decision block 802), then 5G vigilance program 142 and 152 remain in decision block 802 until the authentication has completed. In an embodiment, if the time waiting for the authentication to complete exceeds a threshold, then 5G vigilance program 142 and 152 restart the authentication. In another embodiment, if the time waiting for the authentication to complete exceeds a threshold, then 5G vigilance program 142 and 152 signal an error and ends for this cycle.

5G vigilance program 142 and 152 initiate a lightweight DTCH (step 804). In an embodiment, if 5G vigilance program 142 and 152 determine that the authentication has completed ("yes" branch, decision block 802), then 5G vigilance program 142 and 152 initiate a lightweight DTCH between the UE device and the cell tower. This lightweight DTCH is used by 5G vigilance program 142 and 152 to receive the location information from the UE device to allow 5G vigilance program 142 and 152 to track the vehicle through the patrol area.

5G vigilance program 142 and 152 send location coordinates (step 806). In an embodiment, the instance of 5G vigilance program 142 and 152 running on the UE device invokes the device-based location service and transfers the location coordinates to the lightweight DTCH created in step 804. In an embodiment, the device-based location service may be, for example, a navigation app or GPS incorporated on a smart phone UE device. In another embodiment, the device-based location service may be, for example, a navigation app or GPS integrated into the vehicle itself.

5G vigilance program 142 and 152 determine if a DETACH event was received (decision block 808). In an embodiment, if 5G vigilance program 142 and 152 determine that a DETACH event was not received ("no" branch, decision block 808), then 5G vigilance program 142 and 152 return to step 806 to update the location coordinates of the UE device.

5G vigilance program 142 and 152 stop the device-based location service (step 810). In an embodiment, if 5G vigilance program 142 and 152 determine that a DETACH event was received ("yes" branch, decision block 808), then 5G vigilance program 142 and 152 stops the device-based location service on this UE device; releases the resources of this logical slice of 5G vigilance program 142 and 152; and unmaps the local channel database for the lightweight DTCH.

5G vigilance program 142 and 152 marks the operation complete (step 812). In an embodiment, 5G vigilance program 142 and 152 marks the operation complete. 5G vigilance program 142 and 152 then ends for this cycle.

Figure 9:
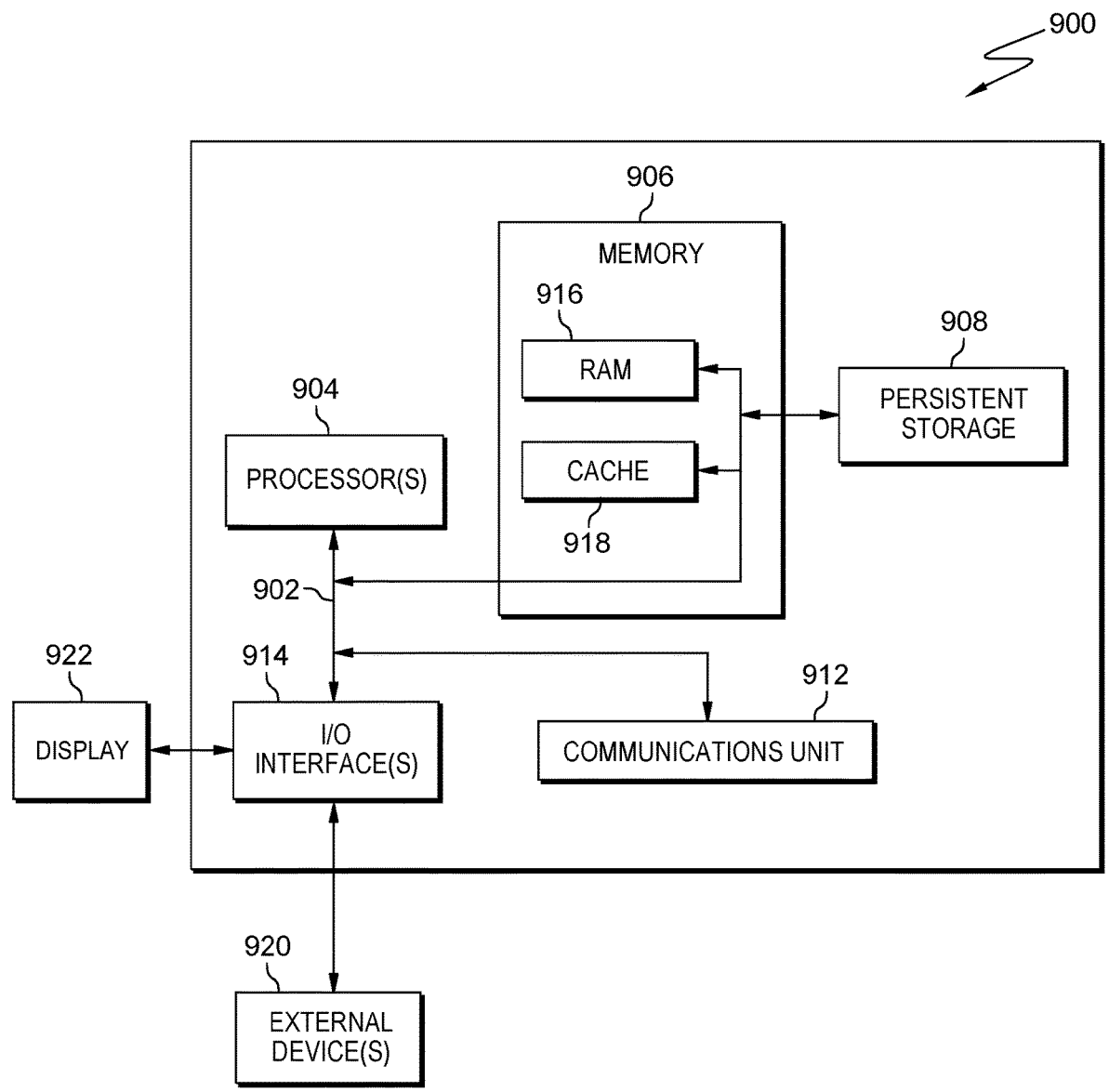
FIG. 9 depicts a block diagram of components of the computing devices executing the 5G vigilance program within the distributed data processing environment of FIG. 1, in accordance with an embodiment of the present invention.

FIG. 9 is a block diagram depicting components of computing device 110 suitable for 5G vigilance program 112, 142, and 152 in accordance with at least one embodiment of the invention. FIG. 9 displays the computer 900, one or more processor(s) 904 (including one or more computer processors), a communications fabric 902, a memory 906 including, a random-access memory (RAM) 916, and a cache 918, a persistent storage 908, a communications unit 912, I/O interfaces 914, a display 922, and external devices 920. It should be appreciated that FIG. 9 provides only an illustration of one embodiment and does not imply any limitations with regard to the environments in which different embodiments may be implemented. Many modifications to the depicted environment may be made.

As depicted, the computer 900 operates over the communications fabric 902, which provides communications between the computer processor(s) 904, memory 906, persistent storage 908, communications unit 912, and input/output (I/O) interface(s) 914. The communications fabric 902 may be implemented with an architecture suitable for passing data or control information between the processors 904 (e.g., microprocessors, communications processors, and network processors), the memory 906, the external devices 920, and any other hardware components within a system. For example, the communications fabric 902 may be implemented with one or more buses.

The memory 906 and persistent storage 908 are computer readable storage media. In the depicted embodiment, the memory 906 comprises a RAM 916 and a cache 918. In general, the memory 906 can include any suitable volatile or non-volatile computer readable storage media. Cache 918 is a fast memory that enhances the performance of processor(s) 904 by holding recently accessed data, and near recently accessed data, from RAM 916.

Program instructions for 5G vigilance program 112, 142, and 152 may be stored in the persistent storage 908, or more generally, any computer readable storage media, for execution by one or more of the respective computer processors 904 via one or more memories of the memory 906. The persistent storage 908 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

The communications unit 912, in these examples, provides for communications with other data processing systems or devices. In these examples, the communications unit 912 includes one or more network interface cards. The communications unit 912 may provide communications through the use of either or both physical and wireless communications links. In the context of some embodiments of the present invention, the source of the various input data may be physically remote to the computer 900 such that the input data may be received, and the output similarly transmitted via the communications unit 912.

The I/O interface(s) 914 allows for input and output of data with other devices that may be connected to computer 900. For example, the I/O interface(s) 914 may provide a connection to external device(s) 920 such as a keyboard, a keypad, a touch screen, a microphone, a digital camera, and/or some other suitable input device. External device(s) 920 can also include portable computer readable storage media such as, for example, thumb drives, portable optical or magnetic disks, and memory cards. Software and data used to practice embodiments of the present invention, e.g., 5G vigilance program 112, 142m and 152 can be stored on such portable computer readable storage media and can be loaded onto persistent storage 908 via the I/O interface(s) 914. I/O interface(s) 914 also connect to a display 922.

Display 922 provides a mechanism to display data to a user and may be, for example, a computer monitor. Display 922 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGAs), or programmable logic arrays (PLAs) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for 5G mobile device based regional patrolling over highways, the computer-implemented method comprising the steps of:
    enabling, by one or more computer processors, a fifth generation (5G) mobile ad-hoc network based on a data received from one or more checkpoints;
    connecting, by the one or more computer processors, a first 5G traffic channel between the 5G mobile ad-hoc network and a virtual network function (VNF);
    responsive to detecting a vehicle containing a 5G UE device in the 5G mobile ad-hoc network, connecting, by the one or more computer processors, a second 5G traffic channel between the 5G UE device in the vehicle and the VNF, wherein the second 5G traffic channel is a lightweight dedicated traffic channel (DTCH);
    responsive to receiving a location information from the 5G UE device in the vehicle, determining, by the one or more computer processors, a location trajectory for the vehicle; and
    responsive to determining that the location trajectory for the vehicle is improbable, sending, by the one or more computer processors, a signal to a patrol manager, wherein the signal includes a last received location for the vehicle.

2. The computer-implemented method of claim 1, wherein each checkpoint of the one or more checkpoints is a stationary structure that contains a 5G UE device and is positioned along a highway to be patrolled.

3. The computer-implemented method of claim 1, wherein the first 5G traffic channel includes a DTCH between each checkpoint of the one or more checkpoints and an eNodeB and an S1 bearer channel between the eNodeB and a serving gateway (SGW).

4. The computer-implemented method of claim 1, wherein responsive to determining that the location trajectory for the vehicle is improbable, sending the signal to the patrol manager, wherein the signal includes the last received location for the vehicle further comprises:
    detecting, by the one or more computer processors, if the location trajectory for the vehicle is unusual;
    responsive to determining that the location trajectory for the vehicle is unusual, retrieving, by the one or more computer processors, the location information for one or more other active 5G UE devices in the 5G mobile ad-hoc network from the VNF;
    retrieving, by the one or more computer processors, a list of location objects for the last received location for the vehicle from a map-based location determination system; and
    determining, by the one or more computer processors, if the last received location for the vehicle is improbable based on the location information for the one or more other active 5G UE devices and the list of location objects from the map-based location determination system.

5. The computer-implemented method of claim 1, wherein responsive to determining that the location trajectory for the vehicle is improbable, utilizing the second 5G traffic channel to establish a voice communications between the checkpoint and the vehicle.

6. The computer-implemented method of claim 1, wherein enabling the 5G mobile ad-hoc network based on the data received from the one or more checkpoints further comprises:
    receiving, by the one or more computer processors, one or more data structures required for enablement of the mobile ad-hoc network;
    loading, by the one or more computer processors, a default setting mode of operation; and
    determining, by the one or more computer processors, a boundary definition of the 5G mobile ad-hoc network based on the one or more data structures.

7. The computer-implemented method of claim 1, wherein responsive to receiving the location information from the 5G UE device in the vehicle, determining the location trajectory for the vehicle further comprises:
    polling, by the one or more computer processors, the vehicle continuously for the location information using a service daemon running in the VNF; and
    determining, by the one or more computer processors, the location trajectory for the vehicle based on the location information from the service daemon.

8. A computer program product for 5G mobile device based regional patrolling over highways, the computer program product comprising one or more computer readable storage media and program instructions stored on the one or more computer readable storage media, the program instructions including instructions to:
    enable a fifth generation (5G) mobile ad-hoc network based on a data received from one or more checkpoints;
    connect a first 5G traffic channel between the 5G mobile ad-hoc network and a virtual network function (VNF);
    responsive to detecting a vehicle containing a 5G UE device in the 5G mobile ad-hoc network, connect a second 5G traffic channel between the 5G UE device in the vehicle and the VNF, wherein the second 5G traffic channel is a lightweight dedicated traffic channel (DTCH);
    responsive to receiving a location information from the 5G UE device in the vehicle, determine a location trajectory for the vehicle; and responsive to determining that the location trajectory for the vehicle is improbable, send a signal to a patrol manager, wherein the signal includes a last received location for the vehicle.

9. The computer program product of claim 8, wherein each checkpoint of the one or more checkpoints is a stationary structure that contains a 5G UE device and is positioned along a highway to be patrolled.

10. The computer program product of claim 8, wherein the first 5G traffic channel includes a DTCH between each checkpoint of the one or more checkpoints and an eNodeB and an S1 bearer channel between the eNodeB and a serving gateway (SGW).

11. The computer program product of claim 8, wherein responsive to determining that the location trajectory for the vehicle is improbable, send the signal to the patrol manager, wherein the signal includes the last received location for the vehicle further comprises one or more of the following program instructions, stored on the one or more computer readable storage media, to:
    detect if the location trajectory for the vehicle is unusual;
    responsive to determining that the location trajectory for the vehicle is unusual, retrieve the location information for one or more other active 5G UE devices in the 5G mobile ad-hoc network from the VNF;
    retrieve a list of location objects for the last received location for the vehicle from a map-based location determination system; and
    determine if the last received location for the vehicle is improbable based on the location information for the one or more other active 5G UE devices and the list of location objects from the map-based location determination system.

12. The computer program product of claim 8, wherein responsive to determining that the location trajectory for the vehicle is improbable, utilizing the second 5G traffic channel to establish a voice communications between the checkpoint and the vehicle.

13. The computer program product of claim 8, wherein enable the 5G mobile ad-hoc network based on the data received from the one or more checkpoints further comprises one or more of the following program instructions, stored on the one or more computer readable storage media, to:
    receive one or more data structures required for enablement of the mobile ad-hoc network;
    load a default setting mode of operation; and
    determine a boundary definition of the 5G mobile ad-hoc network based on the one or more data structures.

14. The computer program product of claim 8, wherein responsive to receiving the location information from the 5G UE device in the vehicle, determine the location trajectory for the vehicle further comprises one or more of the following program instructions, stored on the one or more computer readable storage media, to:
    poll the vehicle continuously for the location information using a service daemon running in the VNF; and
    determine the location trajectory for the vehicle based on the location information from the service daemon.

15. A computer system for 5G mobile device based regional patrolling over highways, the computer system comprising:
    one or more computer processors;
    one or more computer readable storage media; and
    program instructions stored on the one or more computer readable storage media for execution by at least one of the one or more computer processors, the stored program instructions including instructions to:
    enable a fifth generation (5G) mobile ad-hoc network based on a data received from one or more checkpoints;
    connect a first 5G traffic channel between the 5G mobile ad-hoc network and a virtual network function (VNF);
    responsive to detecting a vehicle containing a 5G UE device in the 5G mobile ad-hoc network, connect a second 5G traffic channel between the 5G UE device in the vehicle and the VNF, wherein the second 5G traffic channel is a lightweight dedicated traffic channel (DTCH);
    responsive to receiving a location information from the 5G UE device in the vehicle, determine a location trajectory for the vehicle; and
    responsive to determining that the location trajectory for the vehicle is improbable, send a signal to a patrol manager, wherein the signal includes a last received location for the vehicle.

16. The computer system of claim 15, wherein each checkpoint of the one or more checkpoints is a stationary structure that contains a 5G UE device and is positioned along a highway to be patrolled.

17. The computer system of claim 15, wherein the first 5G traffic channel includes a DTCH between each checkpoint of the one or more checkpoints and an eNodeB and an S1 bearer channel between the eNodeB and a serving gateway (SGW).

18. The computer system of claim 15, wherein responsive to determining that the location trajectory for the vehicle is improbable, send the signal to the patrol manager, wherein the signal includes the last received location for the vehicle further comprises one or more of the following program instructions, stored on the one or more computer readable storage media, to:
    detect if the location trajectory for the vehicle is unusual;
    responsive to determining that the location trajectory for the vehicle is unusual, retrieve the location information for one or more other active 5G UE devices in the 5G mobile ad-hoc network from the VNF;
    retrieve a list of location objects for the last received location for the vehicle from a map-based location determination system; and
    determine if the last received location for the vehicle is improbable based on the location information for the one or more other active 5G UE devices and the list of location objects from the map-based location determination system.

19. The computer system of claim 15, wherein responsive to determining that the location trajectory for the vehicle is improbable, utilizing the second 5G traffic channel to establish a voice communications between the checkpoint and the vehicle.

20. The computer system of claim 15, wherein enable the 5G mobile ad-hoc network based on the data received from the one or more checkpoints further comprises one or more of the following program instructions, stored on the one or more computer readable storage media, to:
    receive one or more data structures required for enablement of the mobile ad-hoc network;
    load a default setting mode of operation; and
    determine a boundary definition of the 5G mobile ad-hoc network based on the one or more data structures.

* * * * *